United States Patent

Bloomberg

[11] Patent Number: 5,581,667
[45] Date of Patent: Dec. 3, 1996

[54] ELECTRONIC TRAPPING SYSTEM FOR DIGITIZED TEXT AND IMAGES

[75] Inventor: Steven J. Bloomberg, Fairport, N.Y.

[73] Assignee: Xerox Corporation, Stamford, Conn.

[21] Appl. No.: 363,082

[22] Filed: Dec. 23, 1994

[51] Int. Cl.⁶ .................... H04N 1/58; G06T 5/30
[52] U.S. Cl. ............... 395/109; 358/501; 358/515; 358/540; 382/257; 382/264; 382/265
[58] Field of Search .................... 395/109, 117; 382/257, 265, 264; 358/540, 501, 504, 515, 517, 518, 530

[56] References Cited

U.S. PATENT DOCUMENTS 5,295,236  3/1994  Bjorge et al. ............... 395/134
5,313,570  5/1994  Dermer et al. .............. 395/131

OTHER PUBLICATIONS

Seybold, Report on Desktop Publishing, vol. 8, No. 6 ISSN: 0889-9762; Feb. 1, 1994.

*Primary Examiner*—Scott A. Rogers

[57] ABSTRACT

A system for digitally trapping color images on a pixel-by-pixel is employed, whereby for each cyan, yellow, magenta and black color separation, an object-oriented trapping process is carried out. After each object is categorized, the original image is separated into a first copy and a second copy. Edge blurring is performed on the edges of the first copy of the original image; masking of a border region is completed on the second copy of the original image according to a laplacian filter, a difference recursive filter or other method. A merged image is created by combining the blurred edge first copy of the image with the mask bordered second copy of the original image; the mask is thereafter removed from the merged image.

9 Claims, 16 Drawing Sheets

ELECTRONIC TRAPPING SYSTEM FOR DIGITIZED TEXT AND IMAGES

The present invention relates to a color text and image edge trapping (or "spreading" and "choking") system for electrophotographic printers and copiers, and more particularly, to an apparatus and method for improving and enhancing full color output text and image quality according to a specialized trapping system.

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles must be supplied.

In the operation of an electrophotographic copier or printer, particularly color machines, it is highly desirable to have means for processing and enhancing text and image quality (hereinafter referred to as "image quality" or the like unless otherwise noted). Particularly in the case of single or multi-pass color printers, it is highly desirable that an image processing system be employed to reduce imaging problems caused by misregistration, shift and other undesirable printed image qualities. Various systems and corrective actions have been taken to prevent the occurrence of these and other undesirable image attributes, to include the following disclosures may be relevant to various aspects of the image trapping and spreading (trapping) system of the present invention:

U.S. Pat. No. 5,313,570

Patentee: Dermer et al

Issued: May 17, 1974

U.S. Pat. No. 5,295,236

Patentee: Bjorge et al

Issued: Mar. 15, 1994

Seybold Report on Desktop Publishing

Vol. 8, No. 6, pp. 1–34

Date: Feb. 1, 1994

U.S. Pat. No. 5,313,570 discloses a method for determining the boundaries between regions of color making up polychromatic document pages or images, in order to compensate for misregistration of printing plates in printing, and thereby to prevent light leaks and other errors at the boundaries so determined. A map of the boundaries is generated, to which trapping operations are applied to form a structured graphic object that is included as the last object imaged in the data representing the original image. The geometrical description of the boundary map determined according to the method of the invention is independent of specific trapping decisions applicable to the associated image.

U.S. Pat. No. 5,295,236 discloses a trapping technique which accepts a Postscript or other page description language (PDL) file and outputs a trapped PDL file. The input page is first divided into sub-portions, or tiles, and the tiles are individually processed by evaluating the input file in a corresponding clipping window. Each tile is then analyzed to determine where edges exist. The edge data is fed to an edge converter which produces a list of color transitions consisting of the analytic description of each edge and the color information along the sides of the edge. The color transition information is fed to a trapping analyzer which generates trap vectors in accordance with a set of desired trapping rules. The trap vectors are then converted to PDL form. As a final step, the trap vectors are added to the original PDL file. The final trapped page may be printed on standard typesetters without the need for special trap generator hardware.

The Seybold Report on Desktop Publishing surveys current market trapping products. Products reviewed are limited to Postscript language applications, and includes comparison between the products specified.

In accordance with one aspect of the present invention, there is provided a method for digitally trapping color images on a pixel-by-pixel basis independently on a set of color separations. For each separation, the steps of categorizing an original image according to a set of object classes and separating the original image into a first copy and a second copy is carried out. Thereafter, a first set of edges of the first copy of the original image are blurred and a border region of the second copy of the original image is masked. A merged image is thereafter created by combining the blurred edge first copy of the image with the mask bordered second copy of the original image; the mask is then removed from the completed merged image.

Other features of the present invention will become apparent as the following description proceeds and upon reference to the drawings, in which.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 17:
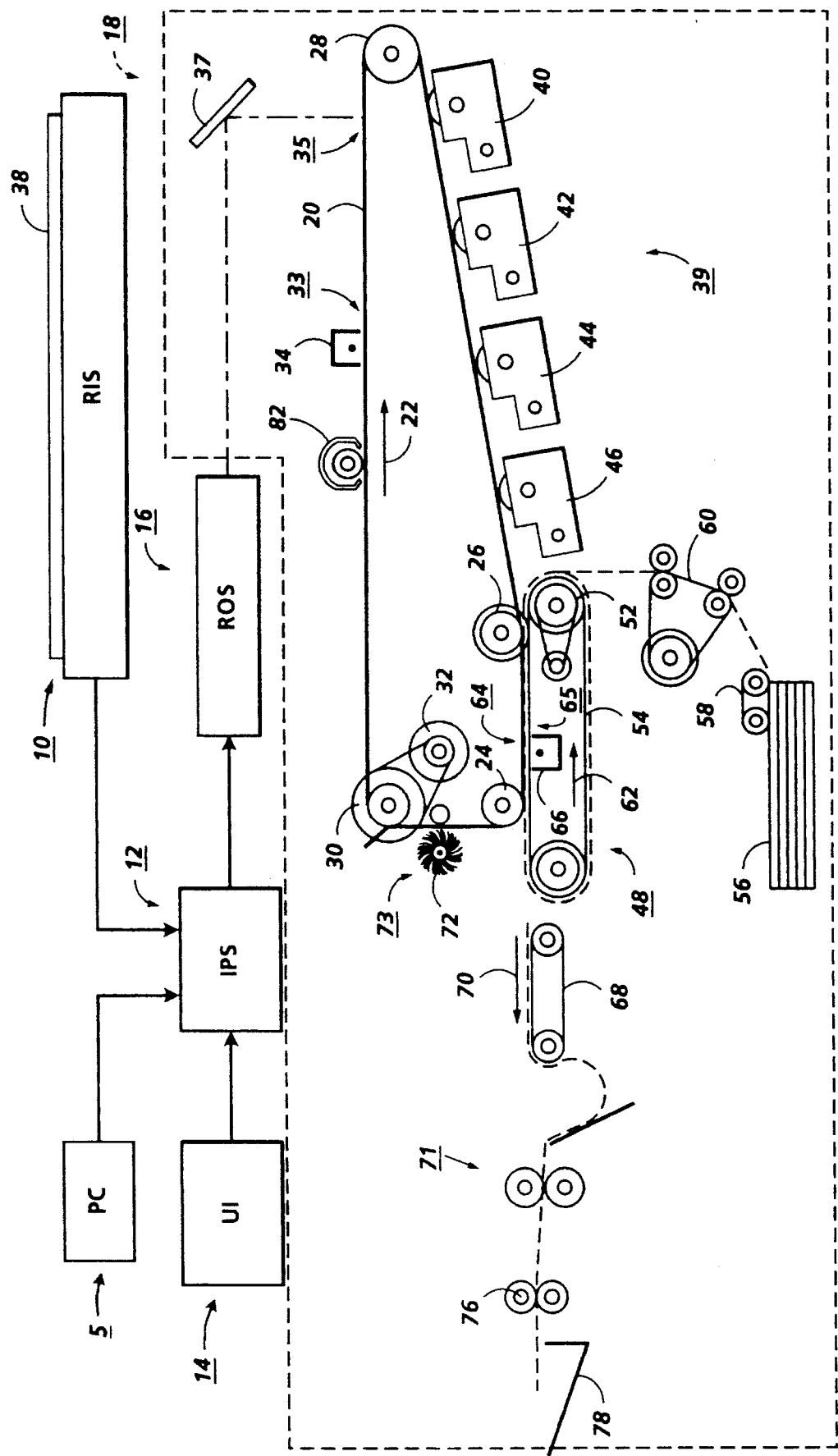
FIG. 17 is a schematic elevational view showing an exemplary color electrophotographic printing machine and networked PC incorporating features of the present invention therein.

For a general understanding of the features of the present invention, reference is made to the drawings. FIG. 17 is a schematic elevational view showing an exemplary electrophotographic printing machine and a networked PC which may incorporate features of the present invention therein. It will become evident from the following discussion that the system of the present invention is equally well suited for use in a wide variety of printing and copying systems, and therefore is not limited in application to the particular system(s) shown and described herein.

To begin by way of general explanation, FIG. 17 is a schematic elevational view showing an electrophotographic printing machine and networked PC which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 17), as well as carry out the trapping system in accordance with the present invention as described in association with FIGS. 1 through 16 below.

Figure 8:
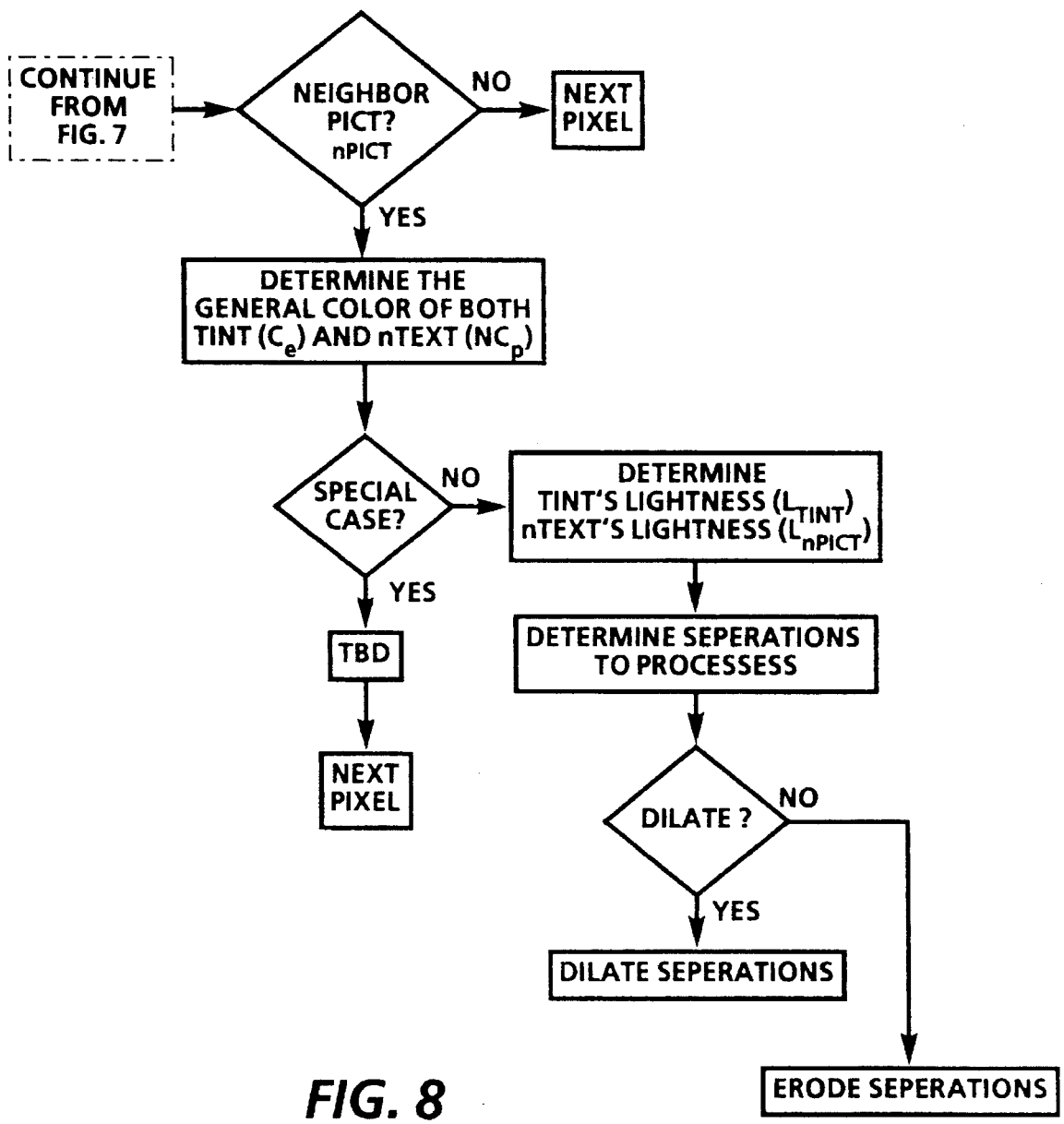
FIG. 8 is a continuation of the FIG. 7 flowchart.
Figure 9:
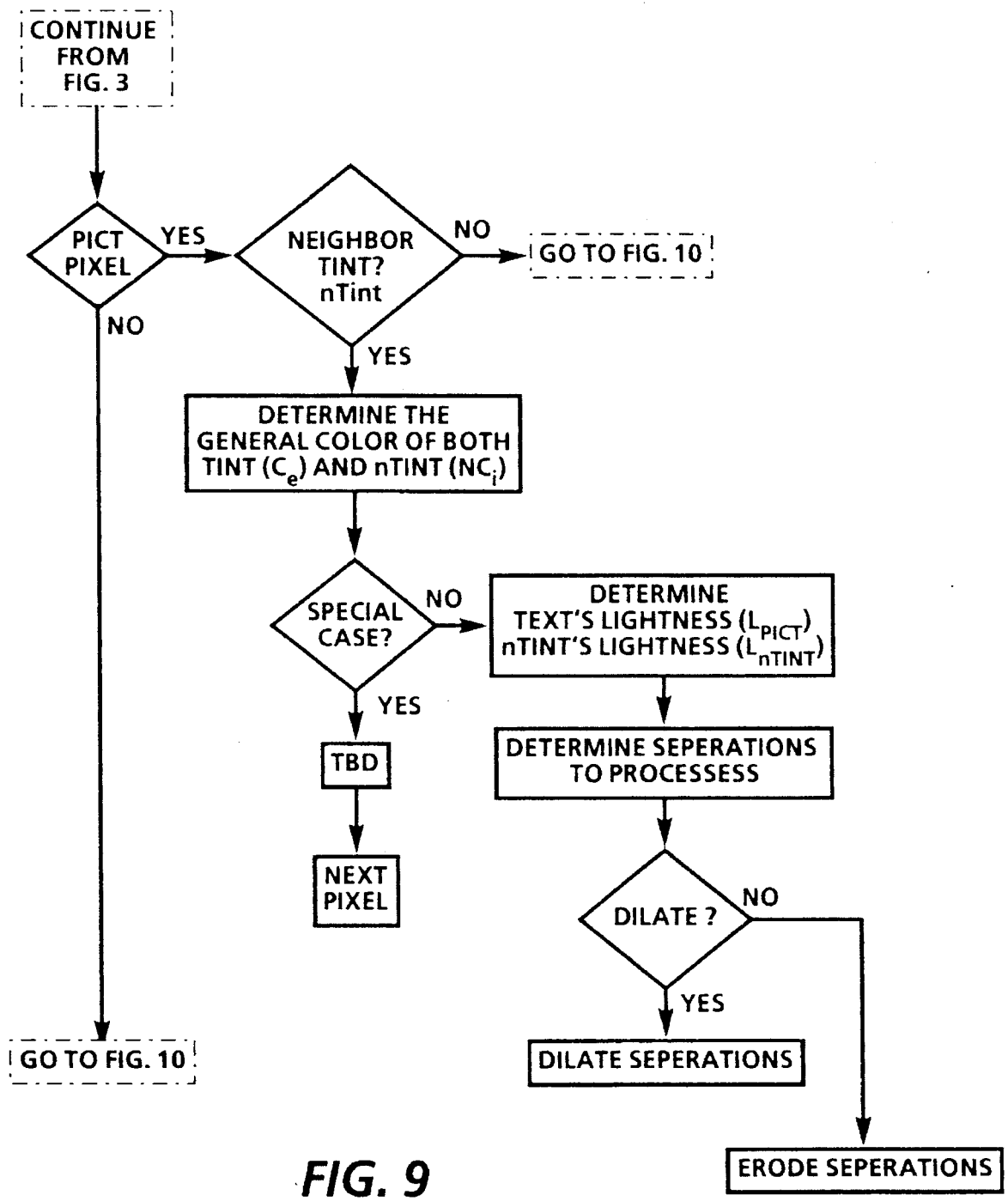
FIG. 9 is a continuation of the FIG. 8 flowchart.
Figure 10:
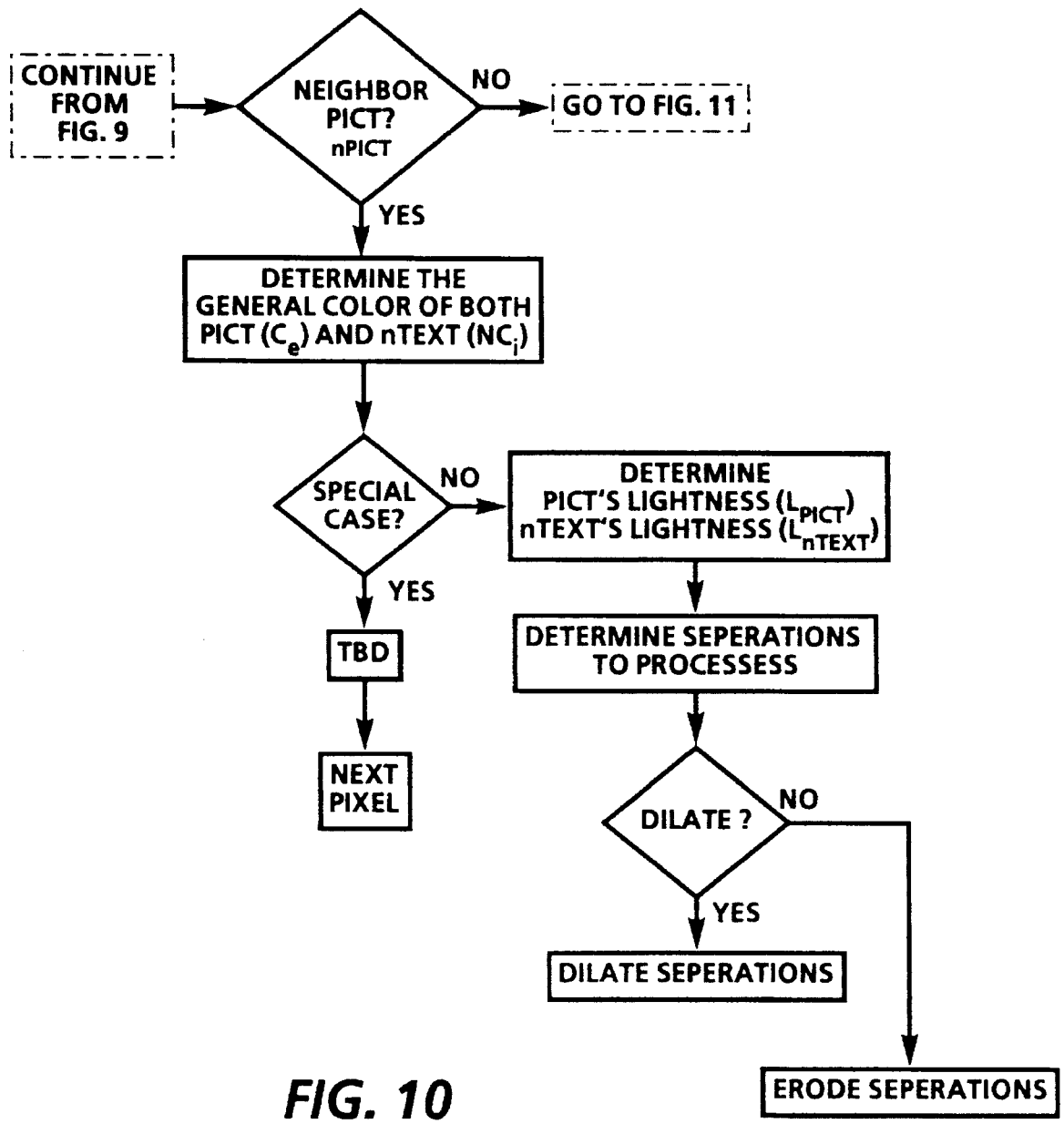
FIG. 10 is a continuation of the FIG. 9 flowchart.
Figure 11:
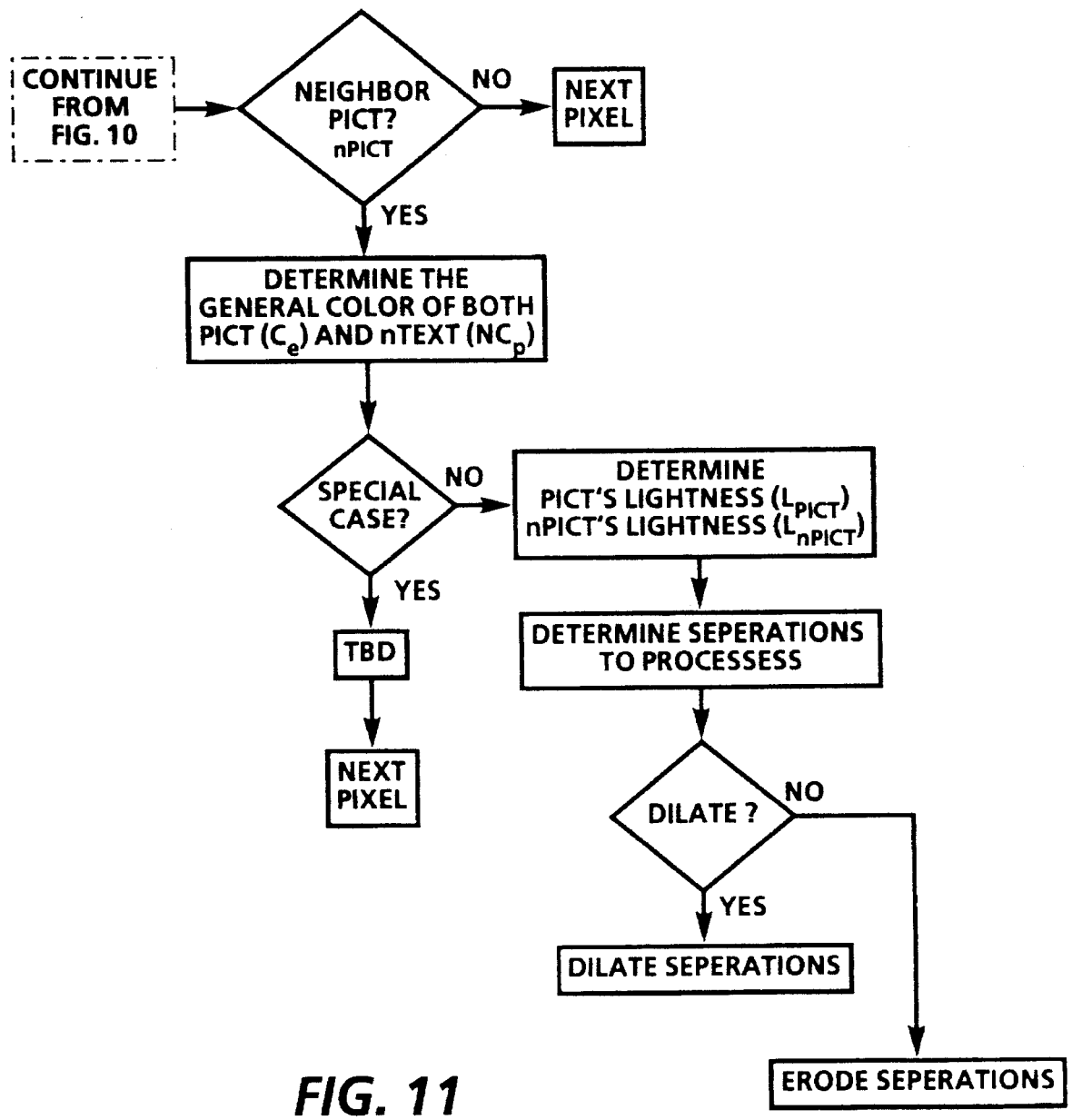
FIG. 11 is a continuation of the FIG. 10 flowchart.
Figure 12:
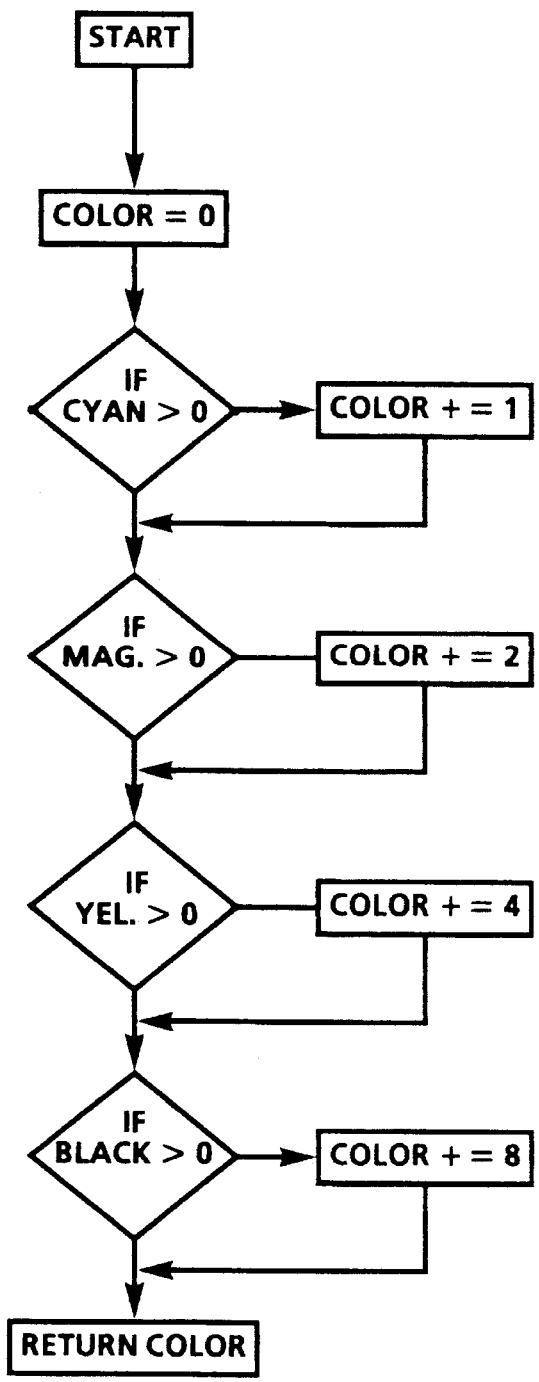
FIG. 12 is a graphic representation of a general color determination table performed on pixels over all color separations.

As further shown in FIG. 17, a multiple color original document 38 (or a test pattern sheet of the present invention as described and shown in FIG. 8) may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Digitized electronic documents may be created, trapped, modified, stored and/or otherwise processed by PC 5 prior to transmission/relay to IPS 12 for printing on printer 18. The display of PC 5 may show electronic documents on a screen (not shown in FIG. 17). The screen of PC 5 may also display and interface with the IPS 12 processor(s) and controller(s), to include those for adjusting printer color and gray balance in accordance with the present invention as described in association with FIGS. 1 through 11 below. IPS 12 may include the processor(s) and controller(s) (not shown in FIG. 17) required to perform the trapping system of the present invention.

IPS 12 also may transmits signals corresponding to the desired electronic or scanned image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A block latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 17, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the. portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 17) extends between belts 54 and moves in unison therewith. A sheet 25 is advanced from a stack of sheets 56 disposed on a tray. A friction retard feeder 58 advances the uppermost sheet from stack 56 onto a pre- transfer transport 60. Transport 60 advances the sheet (not shown in FIG. 13) to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (again, not shown in FIG. 17) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

FIGS. 1 through 16 show the trapping system of the present invention. Multiple color image misregistration is an example of one of the digital color printing problems that can arise when a multi-pass color print engine such as shown and described in association with FIG. 17 is used. For example, when black text is printed on a colored background, yet the registration of the black text and colored background area is not aligned, a white (or the paper's color) "halo" effect on one or more sides of the text may be created, resulting in highly visible and therefore undesirable image quality degradation. In the case of fine print or small graphic images, such misregistration can make text extremely difficult to read and images appear blurred or imprecise. In that "perfect" multi-color printing registration might occur only by chance on even the most precise printing engines, electronic printing technologies must seek image processing solutions to counteract misregistration problems in order to enhance image quality.

The text of a properly registered image on a colored background may be easily read compared to the unregistered image. Misregistration of the color separations or planes may actually be caused by the method in which the image planes are created. Generally, due to image quality versus hardware costs tradeoffs, image quality sacrifices are often made in favor of cost control. Registration problems in the graphic arts industry have been dealt with for years, according to graphic arts spreading and choking techniques. "Spreading" may be defined as growth of an object within the image, while "choking" may be defined as the reduction of an object within the image. In the example of text printing on a colored background, the black text is spread, while the "hollowed out" area in the solid color background is choked. The result is a slight overlap of the solid color background with the black text image, which is able to hide misregistration problems (again, such as may occur with a multi-pass color print engine such as shown and described in association with FIG. 17).

In the graphic arts industry, the spreading and choking processes may be performed by optically magnifying or reducing the desired section of the page and placing this altered image over the original. While trapping (or the combination of spreading and choking) is not complex to implement in the graphics arts industry, a trapping implementation in the the digital electronic imaging industry can be quite difficult. In electronic imaging, one implementation includes changing the page description language (PDL) representation (format) of the image.

Figure 1:
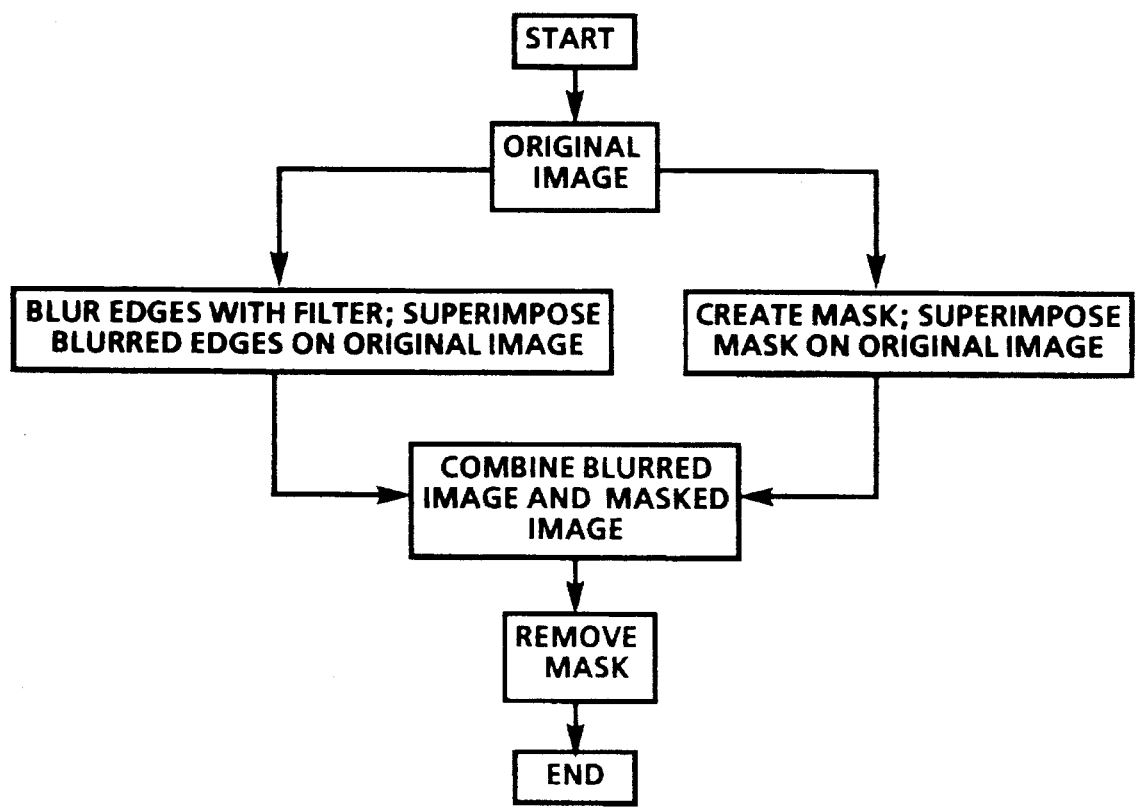
FIG. 1 is a flowchart showing a basic trapping operation system of the present invention.
Figure 2:
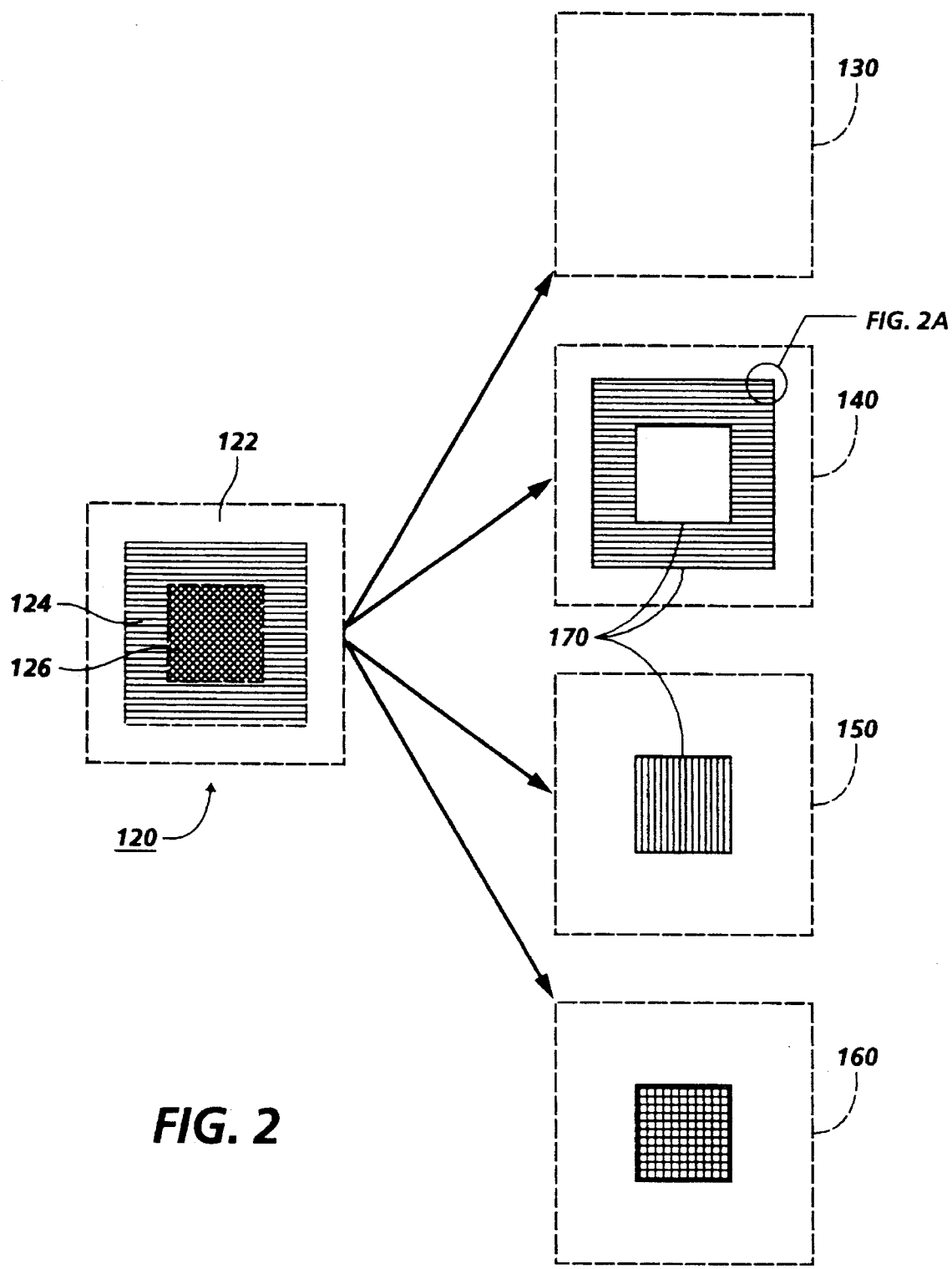
FIG. 2 is a exploded view showing a set of object-oriented color separations.
Figure 2A:
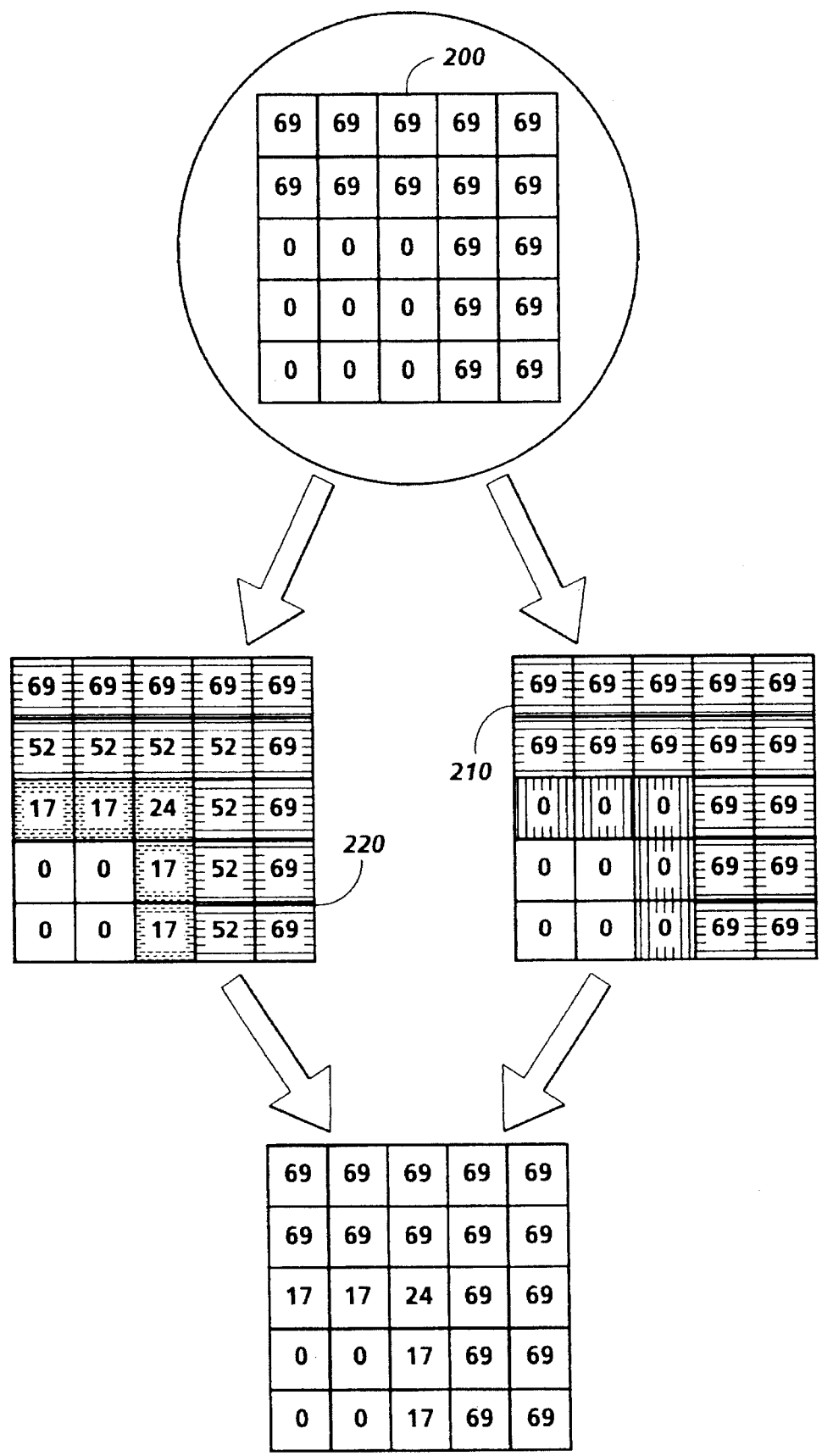
FIG. 2A is a partial representative diagram showing the FIG. 2 trapping operation.

FIGS. 1, 2 and 2A outline a digital version of spreading and choking (trapping) techniques as applied to CMYK separations. The edges of PDL-classified objects, such as text, tints, pictorials, as well as conceivably many other classes of items, are identified within the byte-map itself, and their values are changed to implement the trap. FIG. 1 graphically outlines one realization of the present invention, which is performed independently on each color (CYMK) separation. In one procedure shown in FIG. 1, a mask of the edges locations within the image is made; the mask is then combined with the original image. This procedure may actually entail a series of processes. An edge detection filter such as a laplacian filter or a difference recursive filter (both being known image processing methods) determines the location of edges within an image. The resultant filtered image is then used as a mask superimposed on the original image. Thus, the resultant image now "contains" the mask. In another procedure shown in FIG. 1, a filter is applied to the original image to create what may be termed as a blurred image. Once these two steps are completed (in any order/ sequence or simultaneously, as shown in FIG. 1 ), the results of these steps are combined as follows: if the value of the mask is zero, then the resultant pixel from combining these two data paths has the value of the original image, otherwise, the resultant pixel is equal to the corresponding pixel of the blurred image. To complete the digital trapping process, the mask itself is removed, leaving the trapped the image.

FIGS. 2 and 2A graphically represent the procedures detailed by FIG. 1 on one separation of a multicolored object. Image object 120 is a red square 126 (magenta M and yellow Y) placed inside a cyan (C) square 124, all surrounded by a white 122 background. The four resulting separation masks (black 130, cyan 140, magenta 150 and yellow 160) are further shown in FIG. 2. The black lines 170 in each of the cyan 140, magenta 150 and yellow 160 separations represent the location of a mask where an edge was found. In the case of blank (or white sheet areas), no edge information is present. As shown in the FIG. 2 and 2A implementation, the enlarged original image (cyan separation) portion 200 (FIG. 2A) of object 140 (cyan separations in FIG. 2) will represent colored image pixels "69" (pixels where the image is not equal to zero) as those pixels to be spread, while blank or white "0" areas (pixels where the image is equal to zero) are represented as pixels to be choked.

As shown in FIG. 2A, before, after or at the same time that the masked image 210 is created, the original image is filtered with a blurring filter, so as to increase the size of the (existing color) image. To demonstrate the procedure, a 3 by 3 digital blurring filter (a matrix such as but not limited to one formatted as row 1: "0, 1, 0"; row 2: "1, 0, 1 "; and row 3: "0, 1, 0") is applied to the original image, The results of this filter are shown as Blurred Image 220 in FIG. 2A, in which the "0" (blank) pixels of image 200 have been blurred to the "17" and "24" pixels along pixel border positions 224. As also shown in Blurred Image 220, the "69"(cyan) pixels of image 200 have been blurred into the "52" pixels shown along pixel border positions 226. Once the masked image and the filtered image are created they are then merged. The merging is performed by using "or" logic to combine the two images together, as shown. Where the mask exists and is not zero, the resultant pixels are replaced by the blurred image pixels. The mask is thereafter remove and then the image is sent to be printed, as exemplified in trapped image 230 of FIG. 2A.

Figure 3:
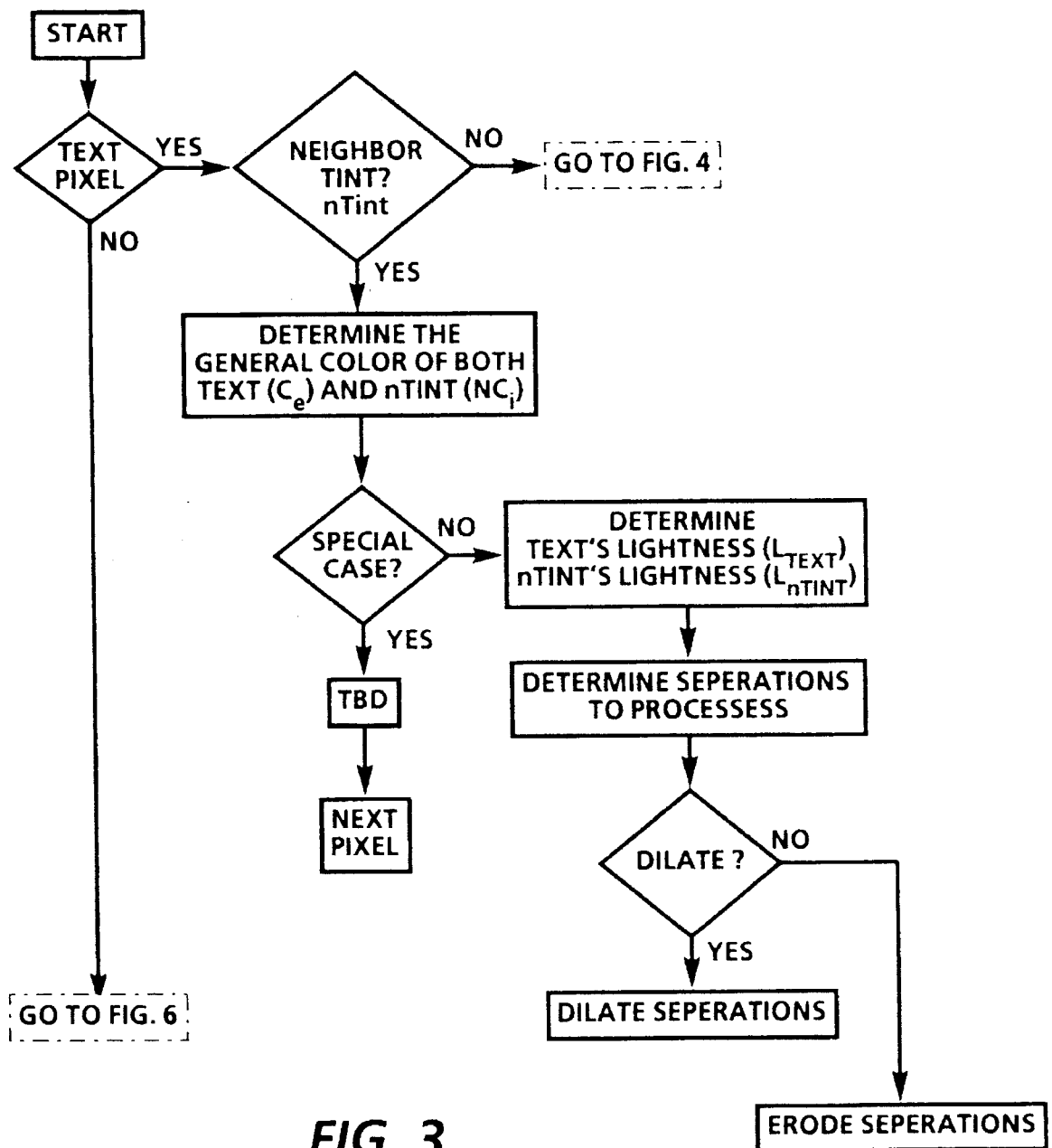
FIG. 3 is a flowchart showing a specific implementation of the pixel-by-pixel dilation/erosion trapping system of the present invention.
Figure 4:
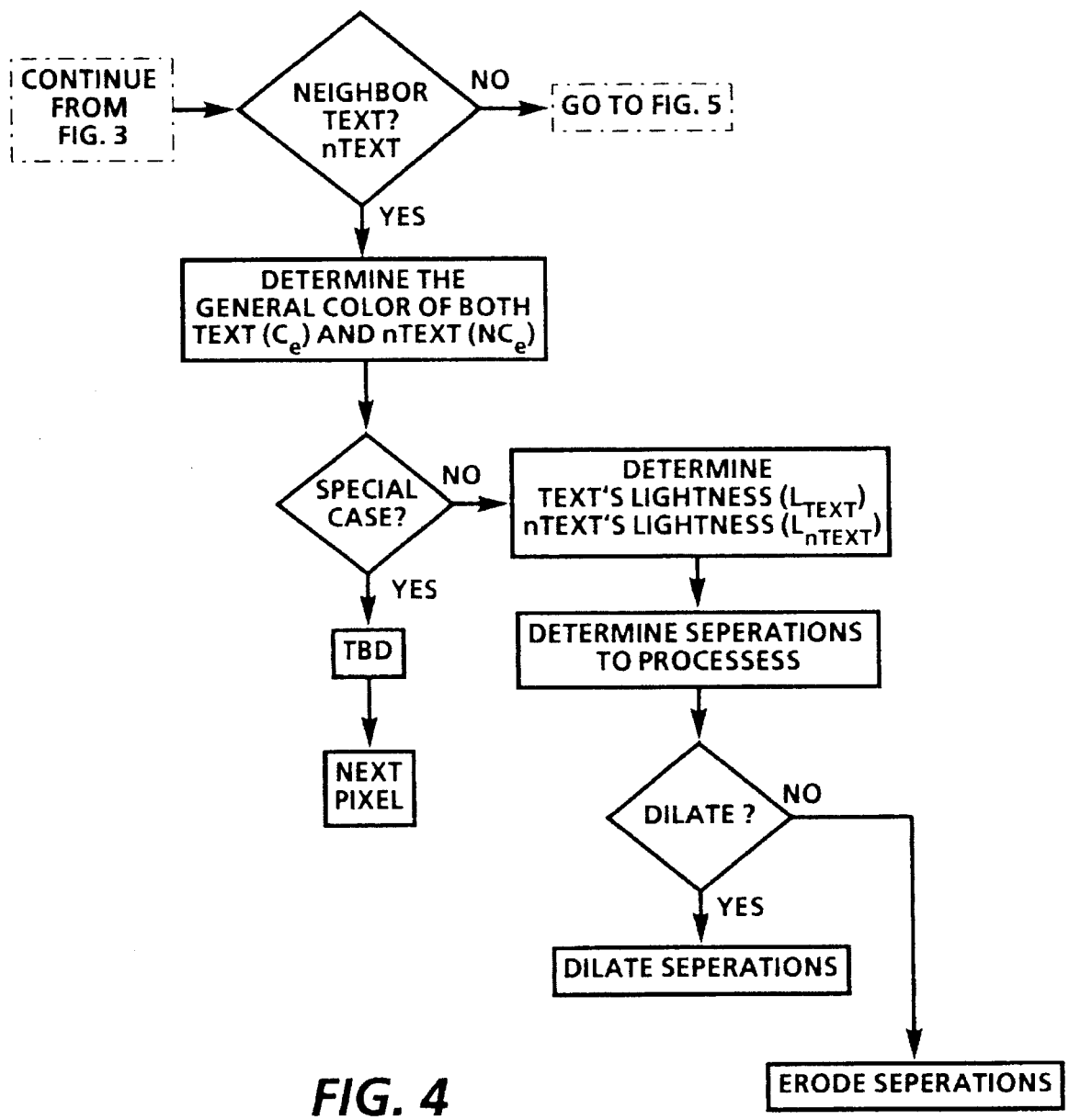
FIG. 4 is a continuation of the FIG. 3 flowchart.
Figure 5:
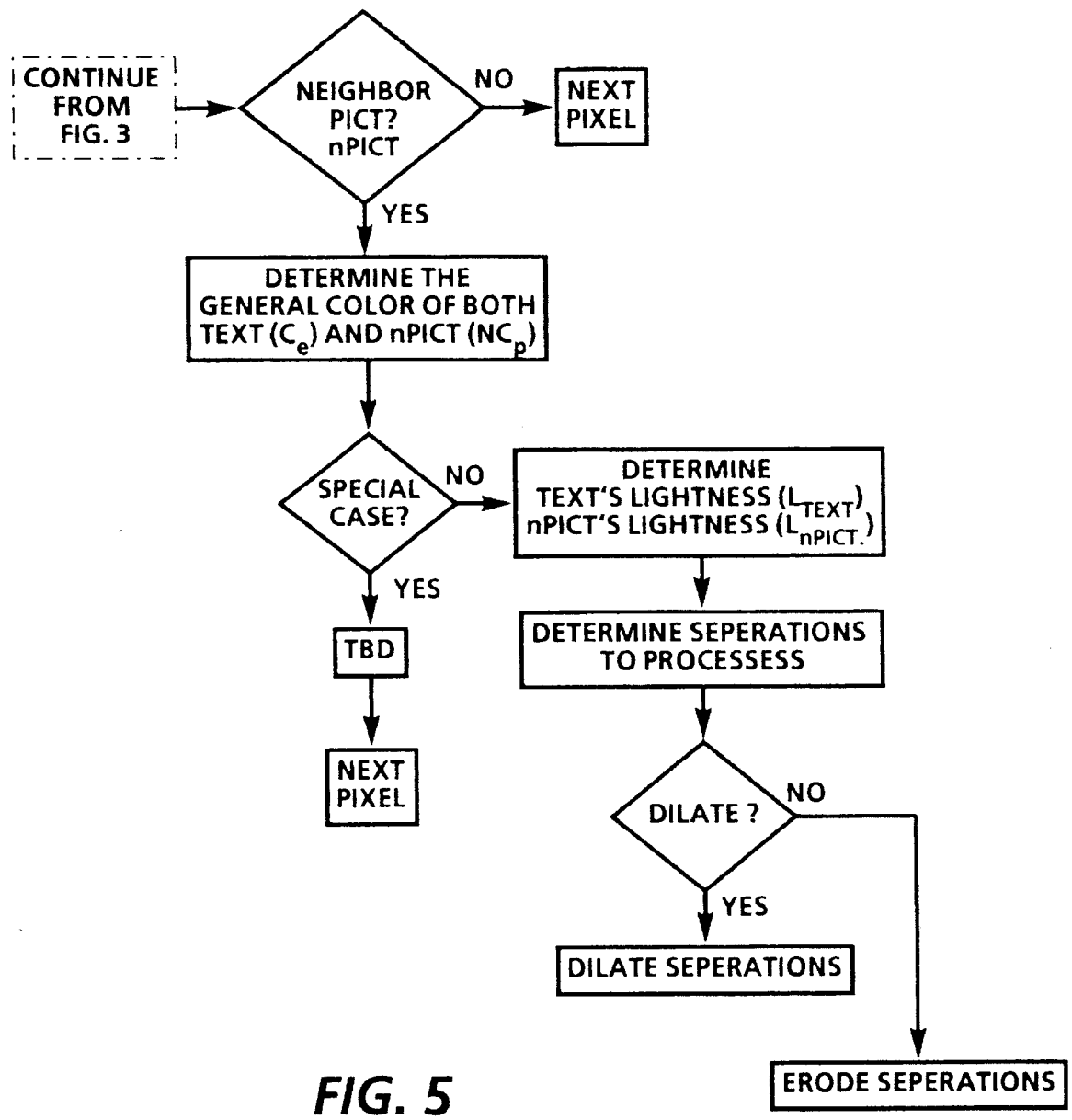
FIG. 5 is a continuation of the FIG. 4 flowchart.
Figure 6:
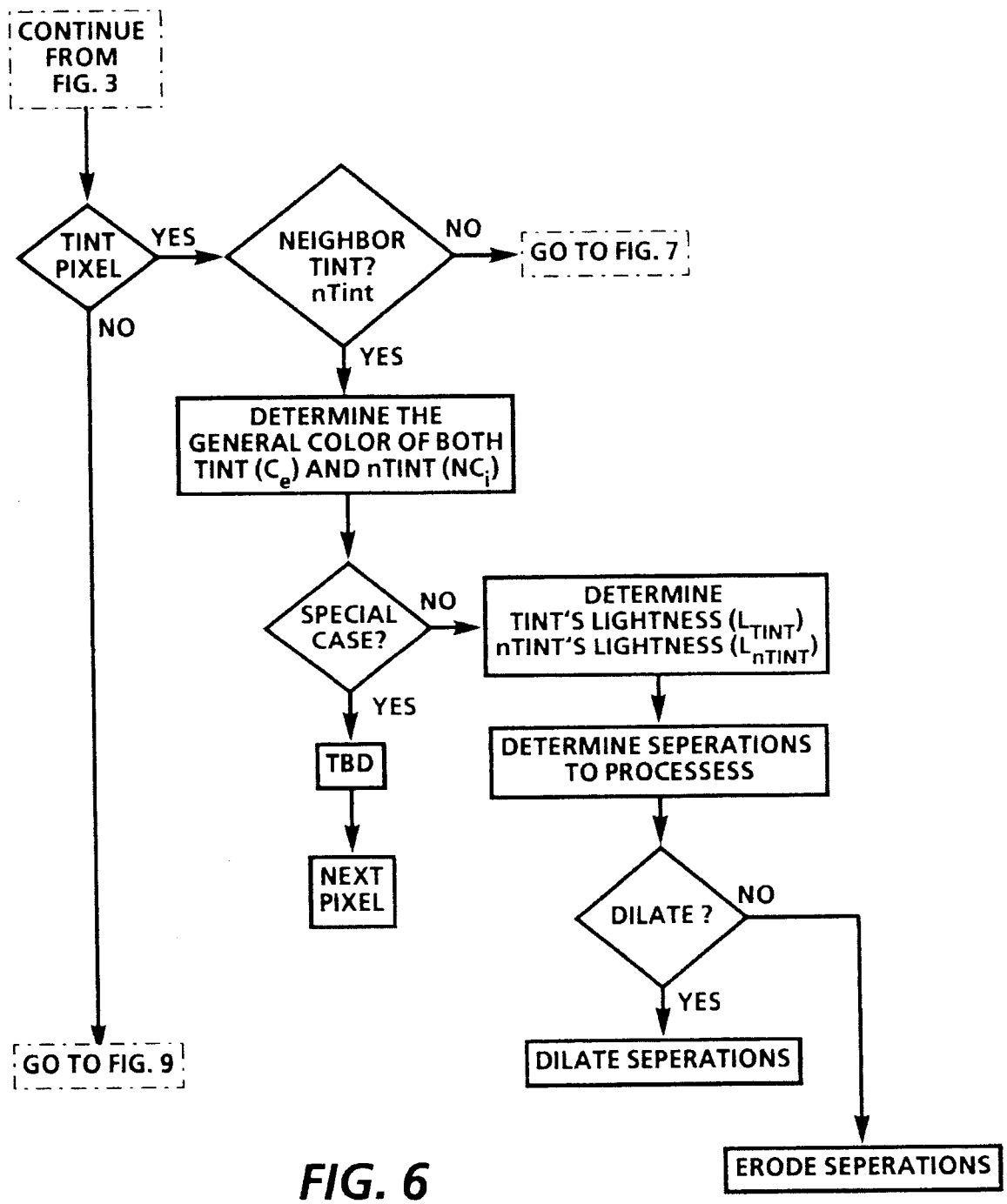
FIG. 6 is a continuation of the FIG. 5 flowchart.
Figure 7:
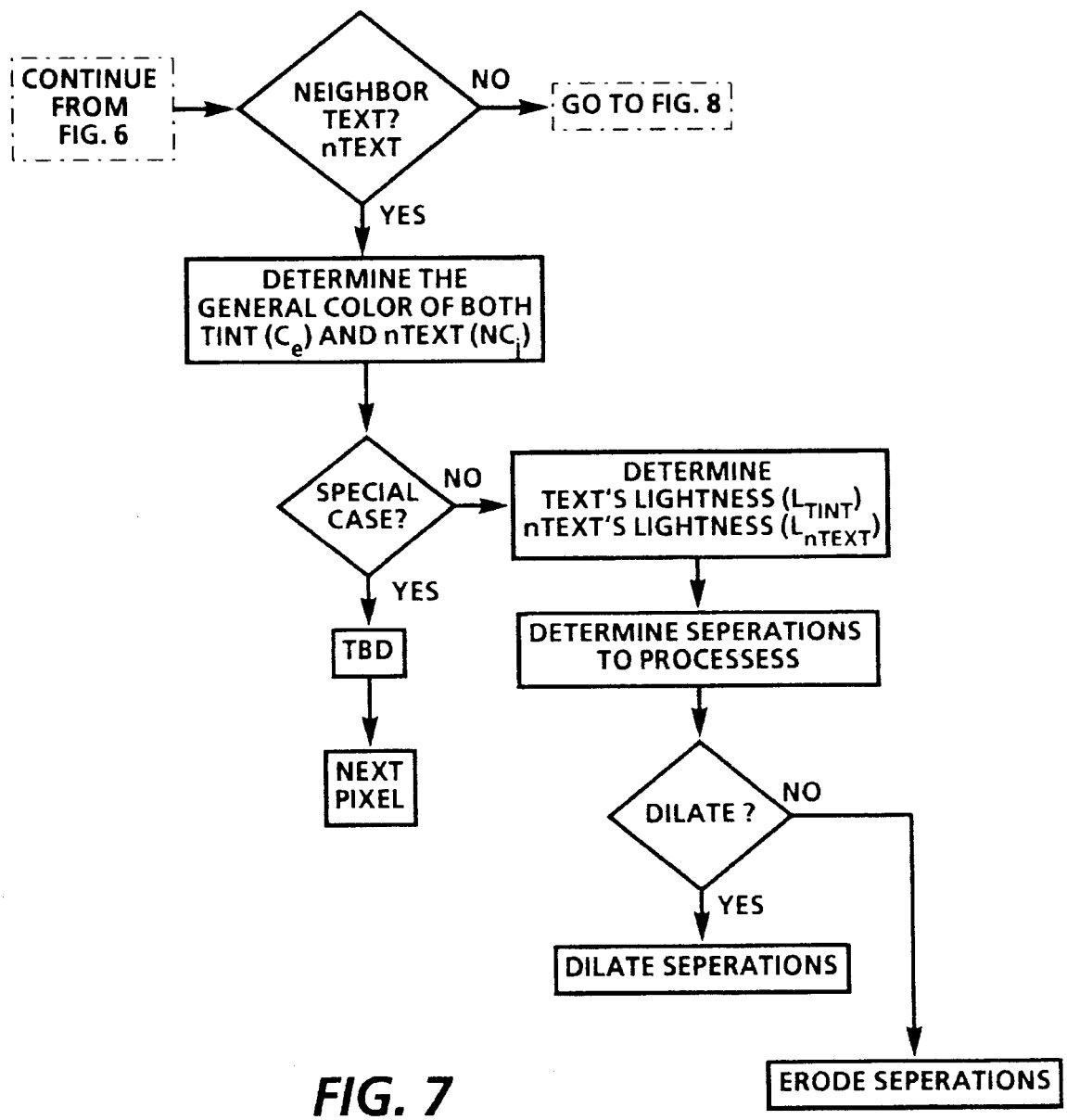
FIG. 7 is a continuation of the FIG. 6 flowchart.

FIGS. 3 through 11 show a specific implementation of the electronic trapping rules based on what may be categorized as object-oriented or object-classified image processing techniques. In addition to using the object-oriented approaches, the use of image processing techniques such as image pixel dilation and erosion are demonstrated in the scope of the current invention. FIGS. 3, 4 and 5 show the procedure for processing text pixels. If the pixel does not form a part of a text object, processing proceeds to the tint (an area of constant color) pixel processing shown in FIGS. 6, 7 and 8. If the pixel does not form a part of a text object or is not a tint (constant color area) object, processing continues shown in FIGS. 9, 10 and 11 for picture (or other) objects. Other object classification approaches may be used, such as spectral sweep objects having changing colors across the object, particular object shape classes or other special case object classes that may be useful in a particular implementation). Accordingly, other object classifications not mentioned herein, could be employed according to the present invention.

An effective electronic process to create the "blurred" image is to grow the desired objects according to dilation and erosion morphological image processing techniques. (An example of dilation would be the substitution of the transition row and column of "0's" with colored image pixels "69" in the Original Image (Cyan Separation) portion 200 of FIG. 2A; an example of image pixel erosion would be the inverse of dilation, that is, the substitution of the transition row and column of colored image pixel "69's" with "0's" in the same portion 200 of FIG. 2A.) Object oriented image processing can prevent potential negative impacts of applying the image processing techniques which perform choking and spreading without regard to object classification. For example, in the case of text fonts, dilation grows both serrifs and the stroke of the font two pixels if a one pixel trap is desired. The growth of two pixels on some characters will undesirably close-up spaces (such as in the characters "e", "i " or "a" in a small font). In addition, pixel growth can cause the text to appear "bold." In pictorials, dilation-related pixel growth may lead to image distortions. To implement dilation/erosion trapping, only those pixels of the desired object type and its neighbors are processed; otherwise the original image is passed on for further processing or passed on without modification that could result in image degradation.

The FIG. 3–11 object classified dilation/erosion trapping system of the present invention is applied with the help of object tags (which may otherwise be known as "meta-bits") that contain information as to the type of image, pictorial, tint or text. These object tags are created using image segmentation techniques for scanned pages or they can be created at the time a document represented in some Page Description Language (PDL) is rendered by the Raster Image Processor (RIP) or imager. The tag bits are used to determine the path (trap or pass) of the image data. Accordingly, in situations in which trapping would cause degradations in image quality, trapping is not performed (pass).

FIGS. 3–11 show the implementation of trapping such that dilation or erosion-related pixel growth problems are minimized by employing logic that dilation/erosion trapping is only applied to appropriate objects such as tint objects and to those objects next to tint objects. (See the FIG. 3, 6 and 9 "Neighbor Tint? " decision blocks, after which object dilation may be applied.) The system proceeds through the various situations in applying object-oriented image optimization. In these indicated trap instances in FIG. 3–11, determination of the general color of the object (text= subscript e; tint=subscript i; and pictorial=subscript p) and its neighbor (same subscripts) is performed for each separation according to FIG. 12. If a "special case" is thereafter determined to exist following the general color determination, exception processing is accomplished (according to cases by case situations known to require exception to otherwise employed dilation or erosion procedures, "TBD", not detailed herein; see FIGS. 3–11.) If no such special case exists, then object and neighbor lightness are thereafter determined, such as according to FIG. 16 (described below), followed by a determination of separations to processes, also as shown in FIGS. 3–11. Once the "Dilate? " decision is made, the color separations are dilated or eroded, after which the system loops to process the next pixel. (FIGS. 3–11.)

Hardware used to implement the trapping system of the present invention may include a scan line buffer capable of holding a requisite "n" set of scanlines "x" bits deep. The selection of the parameters n and x will vary according to the filter size and bit resolution of the imaging system. If system is used, an additional buffer for the tag bits is needed to hold n scanlines by t (tag) bits deep. Tests were performed with Unix C-Shell Script software on pictorial image portions and on multi-sized text. In one test, a pictorial image was processed by employing the electronic trapping color separations regardless of the object type (tint, text or pictorial) within the image. In another test, object-dependent processing was employed. Images from both techniques then had a registration target placed on them after processing, and printed on a Xerox 5775 Digital Color Copier/Printer. The object-irrelevant print resulted in (undesirably) bolded text and fine detail loss in the pictorial image. However, in the object oriented system print, no image distortion is evident. In both test prints, the effects of separation misregistration are lessened. Further test images having a 100% cyan background and 100% black text of 6,8,10, 12, 14,16,18, and 20 point Times Roman text were also processed, by masking the registration error according to the spreading and choking (trapping) system described in FIGS. 1, 2 and 2A. Neither the object classified nor non-object classified techniques resulted in registration errors being introduced into the image, yet the non-object classified processing resulted in (undesirable) text bolding.

Figure 13:
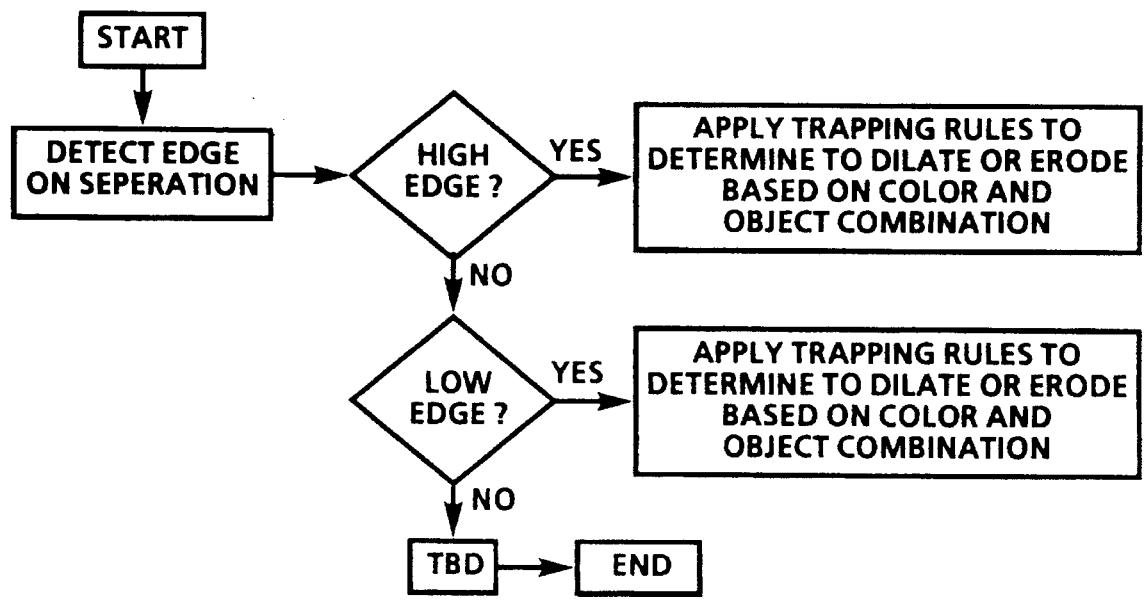
FIG. 13 is a graphic representation of an image processing edge detection operation performed for color separations.
Figure 14:
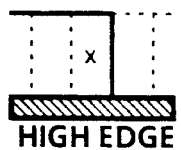
FIG. 14 is a schematic elevational view of a high edge detection.
Figure 15:
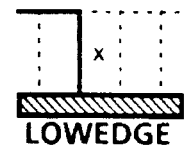
FIG. 15 is a schematic elevational view of a low edge detection.

FIG. 13 shows in aggregate the implementation of a high object edge/low object edge trapping system (see FIGS. 1–2A and FIG. 3–11 ). To start the process, the edge of the image or text is detected upon separation. If the edge is a high edge (such as shown in representative form in FIG. 14), the trapping rules are used to decide whether the edge of the image should be dilated, eroded, processed as an exception or passed on without modification, depending on the particular color or colors present and the object edge. (Erosion would generally be applied to such a high edge found in text, depending on circumstances outlined in FIGS. 3–11.) Dilation would generally be applied when a low edge is detected (such as shown in the FIG. 15 graphic representation) when the object color of the high edge is darker than its neighbor.

In the case of the FIG. 13 system, the generalized objective is to (in the case of the black text on a colored background) spread the edges of the black text and to choke out any white (sheet background) areas of the colored image background. The resultant overlap of the text edges onto the colored background hides or minimizes misregistration problems that might otherwise be evident. Trapping black text on a colored background represents what might be termed as a "less challenging" implementation of trapping, which nevertheless provides a useful example of a process that may be employed. For example, multicolor pictorials, graphic images, tints and colored text on solid or halftoned color backgrounds or combinations thereof represent more challenging trapping implementations.

Figure 16:
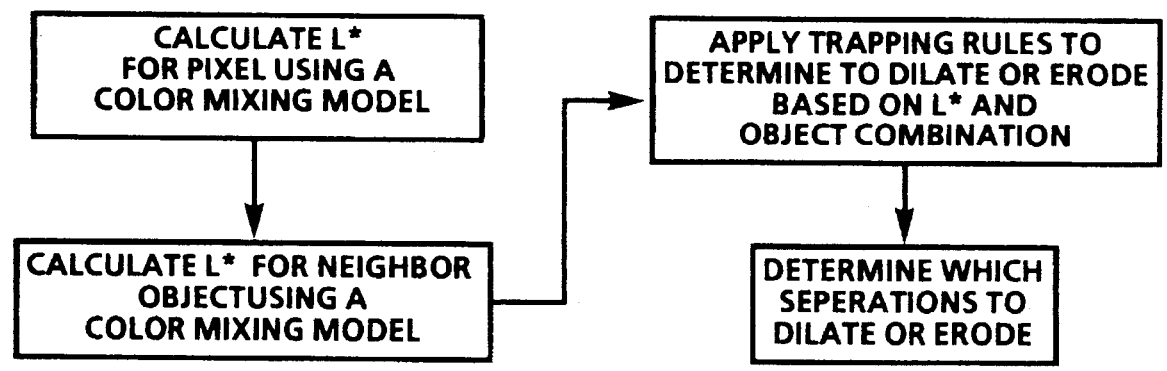
FIG. 16 is a graphic representation of a trapping operation performed on the generalized colors.

FIG. 16 shows a generalized representation of a four step lightness assessment process, which may be ultimately performed independently on each of the pixels or objects or its neighbors, as a variation of previously discussed trapping procedures. In the first step, CIE lightness (L*) is calculated for the pixel using a color mixing model. In the second step L* for the neighbor object is calculated also using a color mixing model. In the third step, the trapping rules are applied to determine whether to dilate or erode the pixel based on L* for the combination of the pixel and the neighboring object. Finally, step 4 requires the determination of which color (CMYK) separations to dilate or erode.

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method for digitally trapping color images on a pixel-by-pixel basis independently on a set of color separations, each separation trapping process comprising:

categorizing an original image according to a set of object classes;

separating the original image into a first copy and a second copy;

blurring a first set of edges of the first copy of the original image;

masking a border region of the second copy of the original image;

creating a merged image by combining the blurred edge first copy of the image with the mask bordered second copy of the original image; and removing the mask from the merged image.

2. The method of claim 1, wherein the step of categorizing an original image according to a set of object classes includes selecting the object class of the original image from among a text object, a tint object or a pictorial object.

3. The method of claim 1, wherein the step of categorizing an original image according to a set of object classes includes tagging the object with a classification identification.

4. The method of claim 1, wherein the step of masking a border region of the second copy of the original image includes processing the first set of edges of the first copy with a laplacian filter.

5. The method of claim 1, wherein the step of masking a border region of the second copy of the original image includes processing the first set of edges of the first copy with a difference recursive filter.

6. The method of claim 1, wherein the step of blurring a first set of edges of the first copy of the original image includes:

profiling each first set of edges of the first copy of the original image as a high edge or a low edge; and applying a set of trapping rules to select a group of the first set of edges of the first copy for dilation.

7. The method of claim 1, wherein the step of blurring a first set of edges of the first copy of the original image includes:

profiling each first set of edges of the first copy of the original image as a high edge or a low edge; and applying a set of trapping rules to select a group of the first set of edges of the first copy for erosion.

8. The method of claim 1, wherein the step of blurring a first set of edges of the first copy of the original image includes:

profiling each first set of edges of the first copy of the original image as a high edge or a low edge;

applying a set of trapping rules to select a first group of the first set of edges of the first copy for erosion; and applying a set of trapping rules to select a second group of the first set of edges of the first copy for dilation.

9. The method of claim 1, wherein the step of blurring a first set of edges of the first copy of the original image includes applying a 3 by 3 binary code matrix having a first row code of "0, 1, 0"; a second row code of 2: "1,0, 1"; and a third row code of "0, 1,0" as blurring filter.

* * * * *